10 # United States Patent Office 3,386,925
Patented June 4, 1968

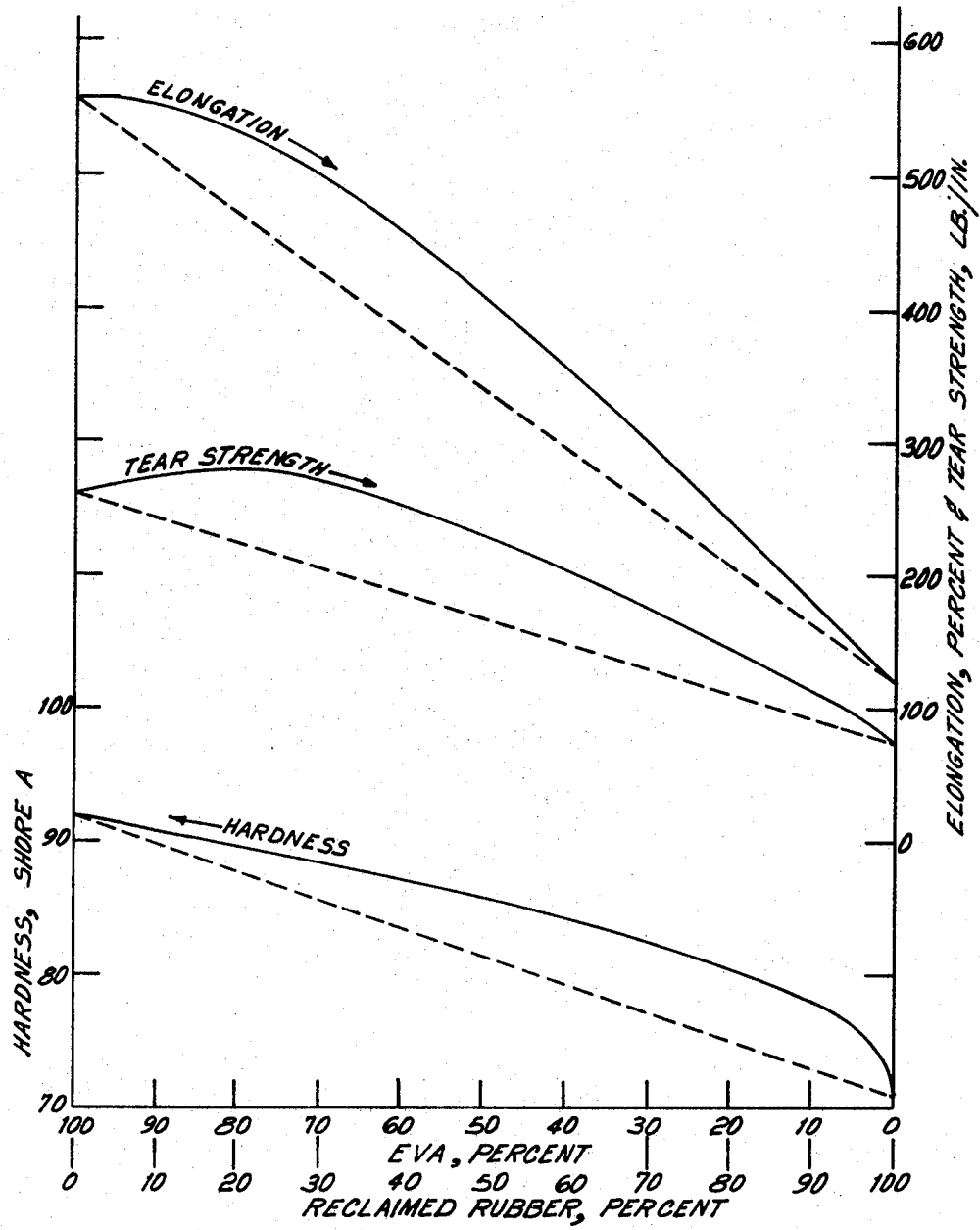

3,386,925
THERMOPLASTIC RUBBER BLENDS COMPRISING RECLAIMED RUBBER AND AN ETHYLENE/ VINYL ACETATE COPOLYMER
James R. Dillhoefer, Cleveland Heights, Ohio, assignor to The Eagle-Picher Company, Cincinnati, Ohio, a corporation of Ohio
Filed Nov. 30, 1965, Ser. No. 510,654
9 Claims. (Cl. 260—2.3)

The present invention relates to novel thermoplastic rubber blends and more particularly to blends of ethylene vinyl acetate copolymers and reclaimed rubber.

Ethylene vinyl acetate copolymers which exhibit elastomeric properties have recently become commercially available. These copolymers, although exhibiting excellent low temperature flexibility, high ozone and weather resistance, and good chemical resistance, are deficient in their utility at elevated temperatures, in their resistance to stress-cracking and in their impact and toughness properties as compared to rubber. Another significant advantage of the elastomeric ethylene vinyl acetate copolymers over rubbers in general is the ease of fabrication inherent in ethylene vinyl acetate copolymers, since ethylene vinyl acetate copolymers can be fabricated by methods used for thermoplastic resins, such as extrusion and injection molding. Any improvement in the properties of ethylene vinyl acetate resins would therefore be of the greatest benefit if it can be accomplished without loss of fabricability of the resin.

It is an object of the present invention to provide elastomeric compositions which exhibit thermoplasticity.

It is another object of the present invention to provide ethylene vinyl acetate copolymer blends which have improved physical properties but which retain substantially the fabricability of the ethylene vinyl acetate copolymer.

It is a further object of the present nivention to provide vulcanized or cross-linked blends of ethylene vinyl acetate copolymers. Other objects will become apparent from the following description and claims.

The novel compositions of the present invention comprise blends of elastomeric ethylene vinyl acetate copolymers, EVA, characterized by vinyl acetate content of 12 to 25 weight percent, based on the copolymer, and a melt index of 0.1 to 10 dg. per minute, and reclaimed rubber. In a preferred embodiment of the present invention, the EVA-reclaimed rubber blends are cross-linked or vulcanized with a free radical forming compound.

Although some improvement in properties is obtained in any ratio of ethylene vinyl acetate copolymer to reclaimed rubber, the blends of the present invention are most useful if the ethylene vinyl acetate copolymer concentration is between 85 and 20% by weight of the blend, the most preferred concentrations of ethylene vinyl acetate copolymer being from 80 to 60% by weight of the blend.

The ethylene vinyl acetate copolymers employed in the formation of the blends of the present invention are obtained by the copolymerization of ethylene and vinyl acetate in accordance with methods known in the art. Ethylene vinyl acetate copolymers having the desired characteristics above indicated are available commercially and have vinyl acetate concentrations of 15 to 20% and melt indices of 1 to 10 dg. per minute.

Reclaimed rubber is similarly commercially available and can be defined as the depolymerization product of vulcanized comminuted rubber which retains at least in part the cross-links imparted by the vulcanization process of the original rubber. The depolymerization of the vulcanized rubber to reclaimed rubber is generally carried out at temperatures above which the original rubber was vulcanized, and such depolymerization is continued until thermoplasticity is restored to the material. Although the chemical reactions occurring during the depolymerization process are not clearly understood, it is believed that the process involves carbon-to-carbon bond scission through oxidation. The depolymerization may be activated by the presence of reclaiming agents such as steam, and unsaturated hydrocarbons, such as naval stores, coal tar products, and unsaturated resin oils obtained in the refining of gasoline. Acids or bases employed to remove the fibers in scrap rubber and retained by the starting material are also believed to aid in the depolymerization. The origin of the reclaimed rubber is not of critical importance and both synthetic as well as natural reclaimed rubber can be employed in the formation of the blends of the present invention. The reclaimed rubbers suitable in the formation of the blends of the present invention are characterized by an acetone extract content of 7 to 25 weight percent, an ash content of 6 to 40 weight percent, a carbon content of 10 to 25 weight percent and a rubber hydrocarbon content of 40 to 65 weight percent, said figures being based on reclaimed rubber. It is to be understood, however, that depending on the application of the blends, properties of the blend may be optimized by the use of a particular reclaimed rubber. Such optimum properties for particular applications can be readily established experimentally.

The blending of the two components may be carried out by any of the techniques known in the art. Thus, the reclaimed rubber and the ethylene vinyl acetate copolymer, in the form of a powder or granules, may be preliminarily dry blended or tumbled and subsequently melt-blended on heated calender rolls or in a Banbury mixer or directly extruded with an extruder containing a mixing section included in the extrusion screw. Other techniques of blending will be apparent to those skilled in the art.

The blends of the present invention must be distinguished from blends normally obtained by the addition of a filler material which is not miscible with the polymer to which it is added. Thus, contrary to the normal behavior of blends of two polymeric materials, the EVA-reclaimed rubber blends of the present invention do not exhibit a straight line change in properties with changing component concentration as would be expected based on the composition of the blend and the mechanical properties of each component of the blend. Contrary to expectation, the mechanical properties of tear strength, hardness, and elongation of the blends of this invention are higher than could be calculated from a straight line relationship based on those properties of each component alone. At least one mechanical property, i.e., tear strength, is even synergistically affected by the blend and is higher than the tear strength of either component. The reason for this unexpected improvement in mechanical properties is not clearly understood but is based on the particular nature of reclaimed rubber as distinguished, for example, from ground vulcanized rubber which acts only as a filler. A possible explanation of the behavior of reclaimed rubber, when blended with ethylene vinyl acetate copolymers, is that there is at least limited miscibility between the reclaimed rubber and the ethylene vinyl acetate copolymer which allows a gradual change from the ethylene vinyl acetate copolymer phase to the reclaimed rubber phase. Such a gradual interphase change cannot be accomplished with a filler such as, for example, comminuted rubber scrap, because the immiscibility of the two materials limits any interaction to the surface of the scrap rubber. The concept of miscibility of the two phases further explains the substantially higher homogeneity of the blends of the present invention, as compared to vulcanized rubber blends, with ethylene vinyl acetate copolymers.

The improvement in mechanical properties resulting from a blend of EVA and reclaimed rubber is particularly outstanding when such blend is cross-linked with a free radical forming compound such as peroxide. For example, the changes in tear strength, hardness and elongation of an EVA-reclaimed rubber blend, cross-linked with 6 percent of dicumyl peroxide, with changing component ratio, is illustrated in the attached figure. As clearly illustrated by this graph, tear strength, hardness and elongation are substantially higher than the calculatable straight line relationship indicated by dotted lines in the figure. The unexpected improvement in tear strength obtained with cross-linked EVA-reclaimed rubber blends which, as can be seen from the attached figure, is exhibited over the entire range of blend concentration from 100 percent of ethylene vinyl acetate copolymer to 100 percent of reclaimed rubber is similarly observed in other mechanical properties. It is believed that the improvement in tear strength obtained in EVA-reclaimed rubber blends is at least in part due to the ability of the cross-linking agent not only to cross-link the molecules of each component but, as a result of having a miscible interphase between the two components, the cross-linking agent is also capable of cross-linking ethylene vinyl acetate copolymer molecules to reclaimed rubber molecules.

As indicated hereinabove, the preferred compositions of the present invention comprise EVA-reclaimed rubber blends which are cross-linked by means of a free radical forming compound. Although any free radical forming compound can be employed to cause cross-linking, those compounds which decompose into free radicals at temperatures above the fabrication temperatures of the blend are preferred. Using such compounds, it is feasible to fabricate the blend of the present invention by extrusion or injection molding at temperatures at which the blend is fluid and deformable and thereafter heating the fabricated article to somewhat higher temperatures to cross-link the material. Preferred free radical forming compounds to form the cross-linked blend of the present invention include in particular peroxides and azonitriles. Suitable peroxides are diacylperoxides, such as benzoyl and lauroyl peroxide; dialykyl peroxides such as ditertiary butyl peroxide; hydroperoxides, such as tertiary butyl hydroperoxide; diaryl peroxides, such as diabenzyl peroxide and dicumyl peroxide; peresters, such as tertiary butyl peracetate and tertiary butyl perbenzoate; and similar peroxides. Suitable azonitriles include alpha-alpha'-azodiisobutyronitrile, and azodicyclohexane carbonitrile.

The free radical forming compound such as the described peroxides and azonitriles useful in the cross-linking of blends of the present invention are well known in the art. Of the described cross-linking agents dicumyl peroxide is generally preferred. The concentration of the cross-linking agent can vary from 0.5 to 10 percent by weight of the blend although in general the concentration of the cross-linking agent will be within the range of 4 to 8 percent by weight of the blend.

The blends of the present invention may be further modified by the addition of inert fillers such as carbon black, silica, clay, asbestos, pigments, stabilizers, plasticizers, and the like. In general, the addition of fillers lowers the elongation while tear strength and hardness are increased. The fillers may be employed in a wide concentration and can be as high as 60 volume percent.

The invention is further illustrated by the following figure and examples.

EXAMPLE 1

A number of blends differing in their proportions of blend components were prepared employing an ethylene vinyl acetate copolymer containing 18 percent by weight of vinyl acetate and having a melt index of 1.5 dg. per minute and reclaimed rubber having an acetone extract content of 20% and an ash content of 8%, a carbon content of 20%, and a rubber hydrocarbon content of 48%. The two components were blended on a rubber mill at about 200–250° F. for a period of about 5 minutes until a homogeneous blend was obtained. The blend was then compression molded into sheets which were employed to measure the properties listed in Table I herein below. The cross-linked blends were obtained by adding dicumyl peroxide during the blending step, compression molding the blend, and thereafter curing the resulting sheets at a temperature of about 330° F. for a period of 10 minutes.

The data in Table I illustrates the high degree of retention of hardness and elongation with increasing contents of reclaimed rubber and the synergistic improvement in tear strength obtained with the blends.

TABLE I

| Blend No. | EVA Copolymer in Parts by Wt. | Reclaimed Rubber in Parts by Wt. | Dicumyl Peroxide in Parts by Wt. | Tear Strength in lb./in. ASTM D-624 | Hardness in Shore A | Elongation in Percent ASTM D-624 D-638-60T |
|---|---|---|---|---|---|---|
| Control | 100 | | | 312 | 92 | 840 |
| Control | 100 | | 6 | 253 | 92 | 550 |
| Control | | 100 | | 37 | 30 | 520 |
| Control | | 100 | 6 | 63 | 71 | 110 |
| 1 | 80 | 20 | | 273 | 89 | 800 |
| 2 | 80 | 20 | 6 | 275 | 90 | 540 |
| 3 | 70 | 30 | | 250 | 89 | 685 |
| 4 | 70 | 30 | 6 | 270 | 90 | 515 |
| 5 | 60 | 40 | | 246 | 85 | 700 |
| 6 | 60 | 40 | 6 | 299 | 89 | 450 |
| 7 | 50 | 50 | | 227 | 81 | 695 |
| 8 | 50 | 50 | 6 | 293 | 87 | 415 |
| 9 | 40 | 60 | | 192 | 78 | 605 |
| 10 | 40 | 60 | 6 | 253 | 84 | 300 |
| 11 | 30 | 70 | | 146 | 71 | 570 |
| 12 | 30 | 70 | 6 | 214 | 83 | 275 |
| 13 | 20 | 80 | | 103 | 61 | 450 |
| 14 | 20 | 80 | 6 | 134 | 80 | 185 |

EXAMPLE 2

Using the procedure of Example 1, blends were prepared using 60 parts of the reclaimed rubber of Example 1, 40 parts of the ethylene vinyl acetate copolymer of Example 1, 6 parts of dicumyl peroxide, and 30 parts of the filler shown in Table II. The blends were formed into sheets and cured at a temperature of 307° F. for a period of 30 minutes. Table II shows the tear strengths, hardnesses and elongations of the blends prepared in this manner. From the data shown it is apparent that the fillers reduce the elongation as compared to the unmodified blend. All of the added fillers increase the tear strength and hardness of the resulting blend.

TABLE II

| Blend No. | Type | Parts by Lot | Tear Strength in lb./in. ASTM D-624 | Hardness in Shore A | Elongation in percent ASTM D-638-60T |
|---|---|---|---|---|---|
| 1 | | | 253 | 84 | 300 |
| 2 | Carbon black | 30 | 278 | 91 | 175 |
| 3 | Colloidal silica | 30 | 281 | 92 | 150 |
| 4 | Asbestos pulp | 30 | 331 | 91 | 160 |
| 5 | Clay | 30 | 252 | 87 | 255 |

The foregoing examples have illustrated the formation of the blends of the present invention, the cross-linking of such blends, and mechanical properties of such blends with and without fillers. It will be apparent that the blends can be formed on equipment other than the rubber mills as described in the examples, such as for example, a Banbury mixer, or an extruder. The compositions of the present invention can be injection molded, extruded, compression molded, and vacuum formed into such useful articles as tubing and hose, gaskets, seals, and shoe soles and shoe heels. Other uses include weather stripping, automotive door and hood bumpers, automotive floor and luggage mats, toys and housewares. The major advantages realized by the use of the blends of the present invention are increased stress crack resistance over EVA, greater ease of incorporating fillers and better high temperature use as compared to EVA, and better low temperature properties, ozone resistance and thermal stability than reclaimed rubber while still retaining the fabricability of EVA.

It will be recognized that many modifications and variations of the foregoing blend compositions can be made without departing from the spirit and scope of the present invention, and it is intended to include such in the invention as hereinabove described and as defined in the appended claims.

What is claimed is:

1. A composition comprising a blend of (1) a copolymer of ethylene and vinyl acetate containing from 12 to 25 weight percent based on the copolymer of vinyl acetate and having a melt index within the range of 0.1 to 10 dg. per minute and (2) reclaimed rubber characterized by an acetone extract content of 7 to 25 weight percent, an ash content of 6 to 40 weight percent, a carbon content of 10 to 25 weight percent, and a rubber hydrocarbon content of 40 to 65 weight percent, said copolymer being present in a concentration of 20 to 85 weight percent based on the blend.

2. The blend of claim 1 wherein the vinyl acetate content of the copolymer is 18 weight percent.

3. The blend of claim 1 wherein the concentration of the copolymer is from 60 to 80 weight percent based on the blend.

4. The blend of claim 3 containing from 0.5 to 10 percent by weight of the blend of a free radical forming compound.

5. The blend of claim 4 wherein the free radical forming compound is peroxide.

6. The blend of claim 4 wherein the free radical forming compound is dicumyl peroxide.

7. A peroxide cross-linked blend of (1) a copolymer of ethylene and vinyl acetate containing from 12 to 15 weight percent based on the copolymer of vinyl acetate and having a melt index within the range of 0.1 to 10 dg. per minute and (2) reclaimed rubber characterized by an acetone extract content of 7 to 25 weight percent, an ash content of 6 to 40 weight percent, a carbon content of 10 to 25 weight percent, and a rubber hydrocarbon content of 40 to 65 weight percent, said copolymer being present in a concentration of 20 to 85 weight percent, based on the blend.

8. The blend of claim 7 wherein filler is added to the blend.

9. The blend of claim 8 wherein the filler is carbon.

References Cited
UNITED STATES PATENTS 2,543,229   2/1951   Chapman _____ 260—4
3,210,301   10/1965   White _____ 260—2.3

MURRAY TILLMAN, *Primary Examiner.*

M. J. TULLY, *Assistant Examiner.*